(12) United States Patent
Netherland

(10) Patent No.: US 10,214,088 B2
(45) Date of Patent: Feb. 26, 2019

(54) SYSTEMS AND METHODS FOR AN ENGINE MOUNTING DEVICE FOR VEHICLES

(71) Applicant: Skylar Netherland, Austin, TX (US)

(72) Inventor: Skylar Netherland, Austin, TX (US)

( * ) Notice: Subject to any disclaimer, the term of this patent is extended or adjusted under 35 U.S.C. 154(b) by 74 days.

(21) Appl. No.: 15/387,918

(22) Filed: Dec. 22, 2016

(65) Prior Publication Data

US 2017/0096055 A1 Apr. 6, 2017

Related U.S. Application Data

(63) Continuation of application No. 14/816,221, filed on Aug. 3, 2015, now Pat. No. 9,561,713.

(60) Provisional application No. 62/097,088, filed on Dec. 28, 2014.

(51) Int. Cl.
| | |
|---|---|
| *B60K 1/00* | (2006.01) |
| *B60K 1/04* | (2006.01) |
| *B60K 5/12* | (2006.01) |
| *F16M 1/00* | (2006.01) |

(52) U.S. Cl.
CPC .............. *B60K 5/1283* (2013.01); *B60K 1/00* (2013.01); *F16M 1/00* (2013.01); *B60K 2001/001* (2013.01); *B60K 2001/0411* (2013.01); *B60K 2001/0416* (2013.01); *B60Y 2200/91* (2013.01); *B60Y 2200/92* (2013.01); *B60Y 2304/076* (2013.01); *B60Y 2304/078* (2013.01)

(58) Field of Classification Search
CPC ...... B60K 2001/001; B60K 2001/0411; B60K 2001/0416; B60K 5/125; B60K 5/1283; B60K 1/00; B60Y 2304/076; B60Y 2304/078; B60Y 2200/91; B60Y 2200/92; F16M 1/00
See application file for complete search history.

(56) References Cited

U.S. PATENT DOCUMENTS

| | | | |
|---|---|---|---|
| 1,812,585 A | 6/1931 | Collins | |
| 3,983,429 A | 9/1976 | Allardice, Jr. | |
| 6,126,128 A | 10/2000 | Costa et al. | |
| 6,494,286 B2 * | 12/2002 | Shimizu | B60K 1/00 180/299 |
| 7,195,213 B2 | 3/2007 | Weatherly | |
| 7,264,215 B2 * | 9/2007 | Niehoff | F16M 11/046 248/157 |
| 7,281,694 B2 | 10/2007 | Allen et al. | |
| 7,316,379 B1 | 1/2008 | Graham | |
| 7,588,117 B2 | 9/2009 | Fukuda | |
| 7,614,473 B2 | 11/2009 | Ono et al. | |
| 8,087,631 B1 | 1/2012 | Gretz | |
| 8,353,374 B2 * | 1/2013 | Sugawara | B60K 1/04 180/65.1 |
| 8,372,530 B2 * | 2/2013 | Kubota | B60K 1/04 180/65.1 |
| 8,567,543 B2 * | 10/2013 | Kubota | B60K 1/04 180/68.5 |

(Continued)

FOREIGN PATENT DOCUMENTS

| | | | |
|---|---|---|---|
| FR | 2975067 A1 * | 11/2012 | ............. B60K 1/00 |
| FR | 2979093 A1 * | 2/2013 | ............. B60K 1/00 |

*Primary Examiner* — Laura Freedman
(74) *Attorney, Agent, or Firm* — Pierson IP, PLLC

(57) ABSTRACT

Embodiments disclosed herein describe systems and methods for a universal electric engine mount for vehicles, wherein the universal engine mount may be configured to be installed into at least any front wheel drive vehicle.

13 Claims, 3 Drawing Sheets

(56) References Cited

U.S. PATENT DOCUMENTS

| | | |
|---|---|---|
| 8,794,580 B1 | 8/2014 | Koehler |
| 8,960,357 B2 * | 2/2015 | Maurer ............... B60K 1/04 |
| | | 180/291 |
| 9,561,713 B2 * | 2/2017 | Netherland ............ F16M 1/00 |
| 2004/0149881 A1 * | 8/2004 | Allen ..................... F16M 7/00 |
| | | 248/676 |
| 2011/0011654 A1 | 1/2011 | Kubota et al. |
| 2013/0004153 A1 | 1/2013 | McKee et al. |
| 2013/0264132 A1 | 10/2013 | Fujiware |

* cited by examiner

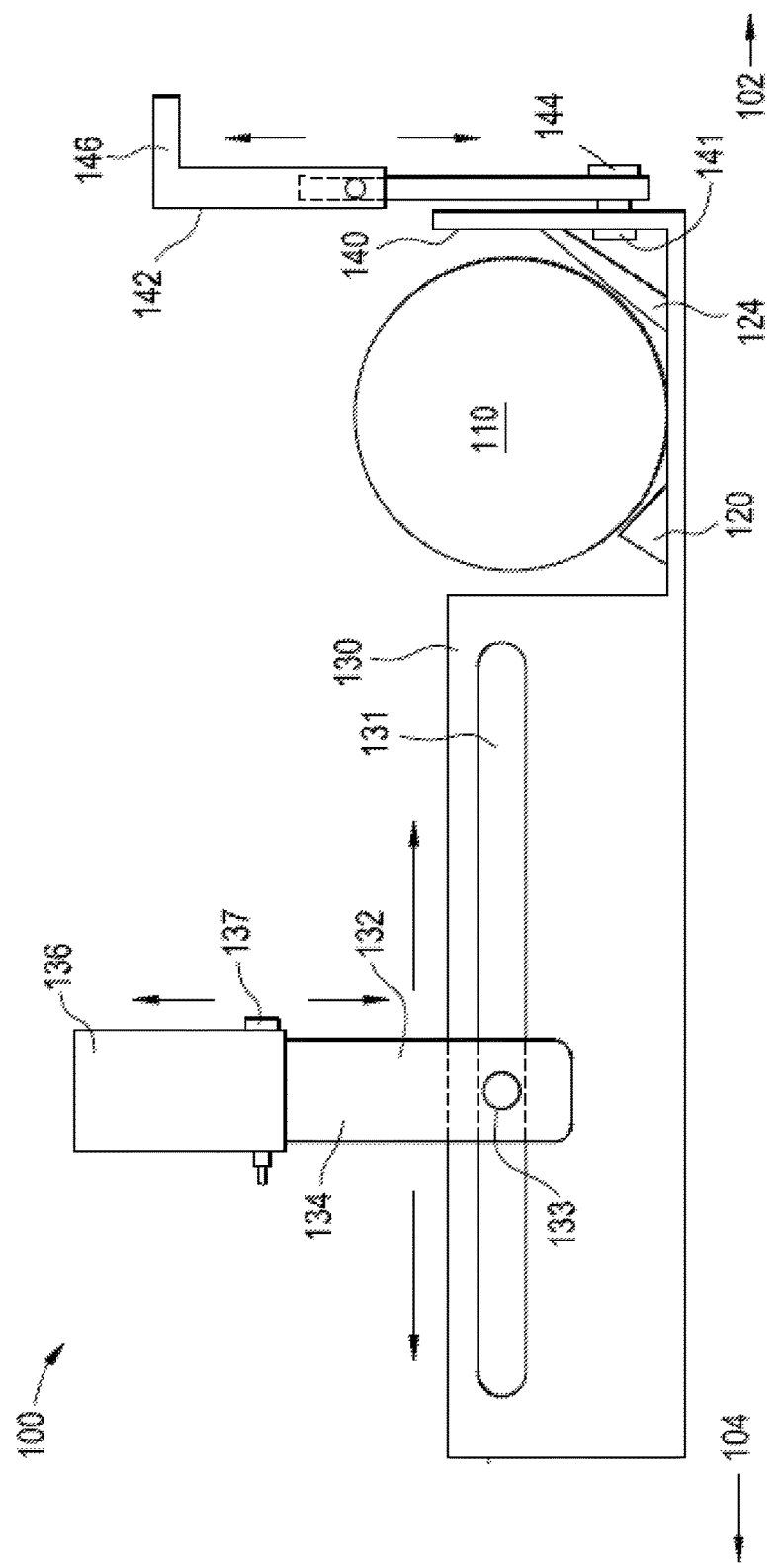

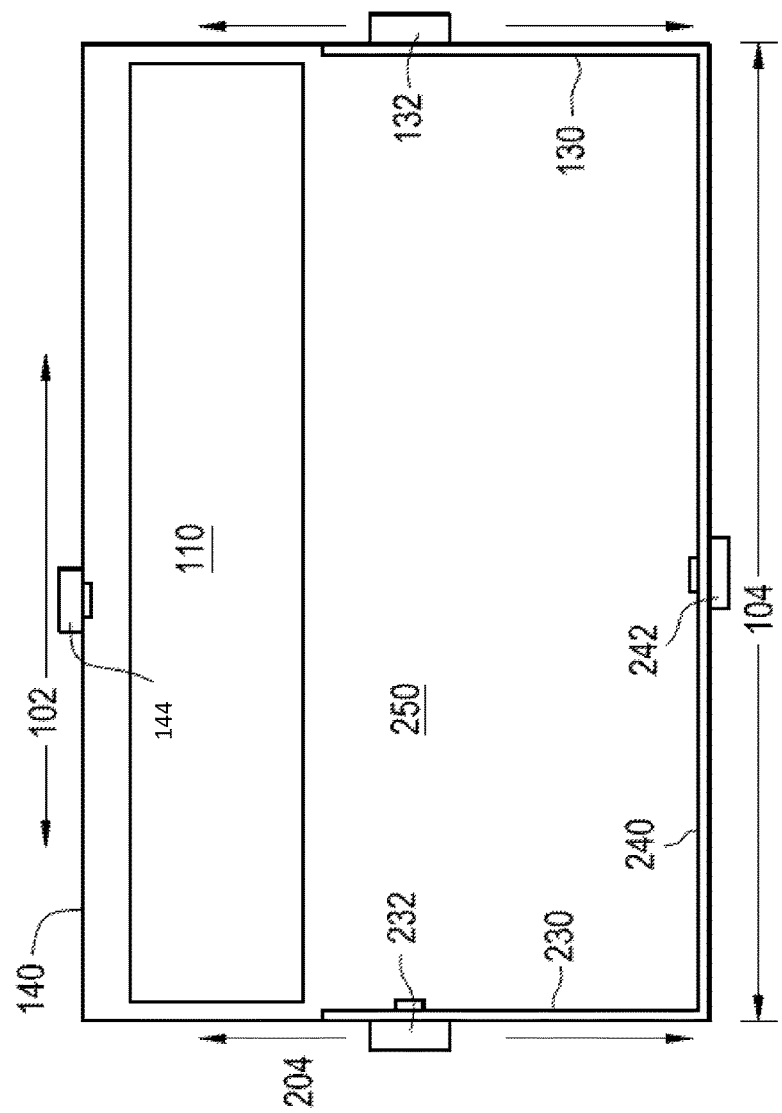

SYSTEMS AND METHODS FOR AN ENGINE MOUNTING DEVICE FOR VEHICLES

CROSS-REFERENCE TO RELATED APPLICATIONS

This application claims a benefit of priority under 35 U.S.C. § 119 to Provisional Application No. 62/097,088 filed on Dec. 28, 2014, and is a continuation of U.S. Pat. No. 9,561,713, which are fully incorporated herein by reference in their entirety.

BACKGROUND INFORMATION

Field of the Disclosure

Examples of the present disclosure are related to systems and methods for a universal mounting device. More particularly, embodiments relate to a universal electric engine mounting device for front wheel drive vehicles.

Background

Similar to conventional engines, electric engines are secured to a vehicle frame via a motor mount. The motor mount allows the electric engine to apply torque to the drivetrain components. The motor mount reacts to move torque applied to the drivetrain components, while preventing the electric engine from moving.

Currently, there is a strong desire to convert conventional vehicles into electric vehicles. However, conventional vehicles have different body shapes and sizes. Therefore, conventional electric motor mounts must be customized to fit a specific conventional vehicle body. Thus, the costs associated with converting a conventional vehicle into an electric or hybrid vehicle are impractical.

Accordingly, needs exist for more effective and efficient systems and methods for a universal mounting device for vehicles, wherein the universal mounting device includes independent and movable mounting arms.

SUMMARY

Embodiments disclosed herein describe systems and methods for a universal electric engine mount for vehicles. The universal engine mount may be configured to be installed into at least any front wheel drive vehicle.

The universal engine mount may be configured to allow a conventional vehicle's chassis to be fitted with an updated electric engine, wherein the electric engine may replace a conventional gasoline or petroleum based engine. Therefore, utilizing embodiments, a conventional front wheel drive vehicle's chassis does not have to be custom fitted with an electric engine mount. In embodiments, the universal engine mount may be configured to be lowered into a vehicle's chassis, and then a plurality of mounting arms may be configured to be independently moved in multiple directions.

In embodiments, components of a conventional vehicle, such as the motor, transmission, exhaust, may be removed. Then, the universal electric engine mount may be installed into the chassis of the conventional vehicle. Next, the electric engine may be secured on the universal electric engine mount to convert the conventional vehicle to an electric vehicle. The universal engine mount may secure the electric engine between the front two wheels of a vehicle, such that the axles associated with the vehicle's wheels may be directly coupled to the electric engine.

In embodiments, the universal electric engine mount may include a plurality of adjustable mounting arms, wherein each of the adjustable mounting arms is configured to be moved and adjusted independent to the other mounting arms. The mounting arms may be configured to be positioned to an outer surface of the electric engine mount, wherein the mounting arms include projections that extend in a direction that is perpendicular to the sidewalls of the electric engine mount. In embodiments, a different adjustable mounting arm may be positioned proximate to each edge of the universal electric engine mount. Accordingly, the electric engine mount may be lowered into a vehicle, and secured to the vehicle, wherein a distance across the projections on the mounting arms is larger than a distance across a base of the electric engine mount.

In embodiments, the adjustable mounting arms positioned on a first side and a second side of the universal electric engine mount may be vertically offset from the adjustable mounting arms positioned on the front and rear of the universal electric engine mount.

In embodiments, the universal electric engine mount may have sidewalls that extend vertically away from a surface of the universal electric engine mount. The sidewalls on the first side and the second side of the universal electric engine mount may not extend across the entirety of the first side or the second side. Because the side sidewalls do not extend across the entire sides of the universal electric engine mount, the axles coupled with the wheels may be directly coupled to the electric engine via the portion of the first side and the second side not covered by the sidewalls.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 depicts a side view of a universal electric engine mount, according to an embodiment.

FIG. 2 depicts a top down view of a universal electric engine mount, according to an embodiment.

Figure 4:
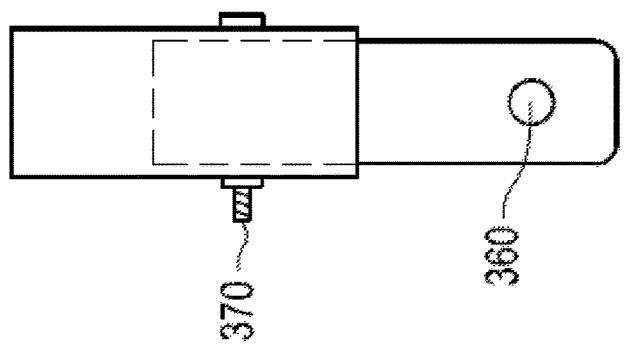
FIG. 4 depicts a back view of adjustable mounting arm, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a universal electric engine mount for vehicles, wherein the universal engine mount may be configured to be installed into at least any front wheel drive vehicle.

FIG. 1 depicts a side view of a universal electric engine mount 100. Universal electric engine mount 100 may be configured to be positioned within a chassis of a conventional vehicle, wherein an electric engine 110 may be secured to the vehicle via universal electric engine mount 100. When electric engine 110 is secured within the chassis via universal electric engine mount 100, the axles (not shown) associated with the front wheels of the vehicle may be directly coupled to electric engine 110. In embodiments, universal electric engine mount 100 may include an engine mounting harness 120, first side sidewall 130, first side mounting arm 132, rear sidewall 140, and rear mounting arm 142.

Engine mounting harness 120 may be positioned proximate to a rear 102 of universal electric engine mount 100. Engine mounting harness 120 may be configured to receive electric engine 110, and secure electric engine 110 within universal electric engine mount 100. When electric engine 110 is mounted within universal electric engine mount 100 via engine mounting harness 120, electric engine 110 may not move.

Engine mounting harness 120 may include a first coupling member and a second coupling member, wherein electric engine 110 may be configured to be positioned between first coupling member and second coupling member. First coupling member may be configured to be positioned adjacent to a front side of electric engine 110, and second coupling member may be configured to be positioned adjacent to a rear of electric engine 110, wherein coupling members may reduce the movement of electric engine 110. In further embodiments, engine mounting harness 120 may include a plurality of straps, cables, etc. that are configured to extend from first coupling member, around electric engine 110, to second coupling member to further secure electric engine 110 within universal electric engine mount 100.

Engine mounting harness 120 may also include sidewall brace 124. Sidewall brace 124 may be configured be coupled with rear sidewall 140 and a surface of universal electric engine mount 100. In embodiments, sidewall brace 124 may be configured to help maintain the integrity of universal electric engine mount 100 when electric engine 110 is mounted.

First side sidewall 130 may be positioned on a first side of universal electric engine mount 100, and may extend from a front end 104 of universal electric engine mount 100 towards a rear end 102 of universal electric engine mount 100. In embodiments, rear end 102 may be positioned closer to a rear end of the vehicle than front end 104, wherein front end 104 may be positioned proximate to the front end of the vehicle. First sidewall 130 may not extend across the entirety of the first side of universal electric engine mount 100, such that the axles associated with the front wheels of the vehicle may be directly couple with electric engine 110 through the portion of the first side of universal electric engine mount not covered by first sidewall 130. First sidewall 130 may extend vertically away from a base surface of universal electric engine mount 100 to protect components, such as batteries, air conditioning, and power steering positioned on the base surface of universal electric engine mount 100. In specific embodiments, first sidewall 130 may be twelve inches in length, and four and half inches in height.

First sidewall 130 may include channel 131 and first mounting arm 132. Channel 131 may be an orifice, depression, groove, etc. within first sidewall 130 that extends across the length of first sidewall 130. Channel 131 may be positioned at a first height from a base surface of universal electric engine mount 100, wherein the first height is proximate to a top edge of first sidewall 130. Channel 131 may be configured to receive a bolt, projection, etc. (referred to hereinafter collectively and individually as "bolt 133"), wherein bolt 133 is coupled to first mounting arm 132.

In embodiments, bolt 133 may be inserted through channel 131 to secure first mounting arm 132 to first sidewall 130. Bolt 133 may be configured to move, slide, etc. within channel 131 to allow first mounting arm 132 to be located at various positions within channel 131. In embodiments, a second mounting arm (not shown) may be positioned on a second sidewall (not shown) of universal electric engine mount 100, wherein the second sidewall is positioned on the opposite side of universal electric engine mount, as depicted in FIG. 2.

First mounting arm 132 may include a bottom portion 134 and a top portion 136. Top portion 136 may include a fastener 137 and a plurality of orifices, such as a bolt, that is configured to extend through one of the orifices positioned on top portion 136 and bottom portion 134 to couple top portion 136 and bottom portion 134. Responsive to inserting fastener 137 through top portion 136 and bottom portion 134, top portion 136 may be secured in place. Responsive to removing fastener 137 and inserting fastener 137 through a different orifice positioned on top portion 136 and bottom portion 134, the height of an upper surface of first mounting arm 130 may be dynamically changed.

Rear sidewall 140 may be positioned proximate to rear end 102 of universal electric engine mount 100, and rear sidewall 140 may extend across the entire rear edge of electric engine mount 100. Rear sidewall 140 may be positioned behind electric engine 110 when positioned within a vehicle, and rear sidewall 140 may extend vertically away from the base of universal electric engine mount to protect electric engine and components positioned on the base surface of universal electric engine mount 100.

Rear sidewall 140 may have a height that is the same height as first sidewall 130. However, rear sidewall 140 may have a channel 141 that is vertically offset from channel 131 that is positioned on first sidewall 130. Channel 141 may be positioned at a height that is less than the height of channel 131. In embodiments, channel 141 may be proximate to a bottom edge of rear sidewall 130, and channel 141 may extend across a length of rear sidewall 140.

Bolt 144 may be configured to be inserted into channel 141 to couple rear mounting arm 142 and rear sidewall 140. Responsive to bolt 144 being inserted into channel 141, rear mounting arm 142 may move along a rear edge of universal mounting electric engine mount 100 to be located at various positions. In embodiments, rear mounting arm 142 may be configured to move within channel 141 in a direction that is perpendicular to the movement of first mounting arm 132 within first sidewall 130.

Similar to first mounting arm 132, rear mounting arm 142 may include a bottom portion and a top portion, wherein the bottom portion of rear mounting arm 142 includes bolt 144 that is configured to be inserted into channel 141. In embodiments, first mounting arm 132 and rear mounting arm 142 may be similarly shaped and/or sized.

Furthermore, rear mounting arm 142 (and first mounting arm 132) may include a projection, overhang, etc. (referred to individually and collectively hereinafter as "projection 146"). Projection 146 may extend away from a base surface of universal electric engine mount 100. Projection 146 may be configured to be positioned over a chassis of a vehicle, and outside of the base surface of universal electric engine mount 100. Responsive to positioning projections 146 of a plurality of mounting arms positioned on each edge of universal electric engine mount 100 over the chassis of the vehicle, universal electric engine mount 100 may be secured in place. Accordingly, the base surface of universal electric engine mount 100 may have a smaller length and width than the distance between corresponding projections 146 on mounting arms.

FIG. 2 depicts one embodiment of a top down view of a universal electric engine mount 100.

As depicted in FIG. 2, universal electric engine mount 100 may have a second sidewall 230 with a second attachment arm 232 positioned on an opposite edge of universal electric engine mount 100 as first sidewall 130. In embodiments, second sidewall 230 and second attachment arm 232 may be symmetrical with first sidewall wall 130 and first attachment arm 132, respectively. Accordingly, second sidewall 230 may not extend across the entire second edge 204 of universal electric engine mount 100, such that an axle of a front of a wheel may be directly coupled to electric engine 100. The axle of the vehicle may directly couple with electric engine 100 via the gap on first sidewall 130 and second sidewall 230 on the first and second sides of electric engine mount 100.

As further depicted in FIG. 2, universal electric engine mount 100 may have a front sidewall 240 with a front attachment arm 242 positioned on a front edge 104 of universal electric engine mount 100, wherein front edge 104 is positioned on an opposite edge of universal electric engine mount 100 as rear edge 102. In embodiments, front sidewall 240 and front attachment arm 242 may be symmetrical with rear sidewall 140 and rear attachment arm 142, respectively. Accordingly, front sidewall 240 may be configured to extend across the entire front edge 104 of universal engine mount 100. Furthermore, front attachment arm 242 may be coupled to a channel positioned on front sidewall 240 that is vertically offset from the channels positioned on first sidewall 130 and second sidewall 230, wherein the channel positioned on front sidewall 240 may be vertically in-line with the channel positioned on rear sidewall 140.

First sidewall 130, second sidewall 230, rear sidewall 140, and front sidewall 240 may form a cavity with a base surface 250 of universal electric engine mount 100, wherein the cavity is protected by the four sidewalls. Base surface 250 may be configured to house components of the electric vehicle, such as electric engine 110, batteries, air conditioning, and power steering components. The sidewalls 130, 230, 140, and 240 may be configured to shield and/or secure the components positioned on base surface 250.

In embodiments, first mounting arm 132, second mounting arm 232, rear mounting arm 142, and front mounting arm 242 are configured to be dynamically moved within a respective channel independent of the other mounting arms. Furthermore, the height of each mounting arm may be dynamically changed independent to the height of the other mounting arms. However, the shape and/or size of base surface 250 may maintain the same dimensions. Therefore, the depth of the cavity defined by base surface 250 and the sidewalls, may be dynamically changed. Additionally, the mounting arms may each have a different vertical and linear offsets from each other, such that the mounting arms are misaligned.

Furthermore, by dynamically adjusting each of the adjustable mounting arms 132, 232, 142, and 242 to align with an attachment point of an existing motor mount or chassis of a vehicle, universal electric engine mount 100 may be configured to couple with any existing vehicle, while allowing axles of the front wheels of the vehicle to be directly coupled to electric engine 110 positioned within base surface 250.

Figure 3:
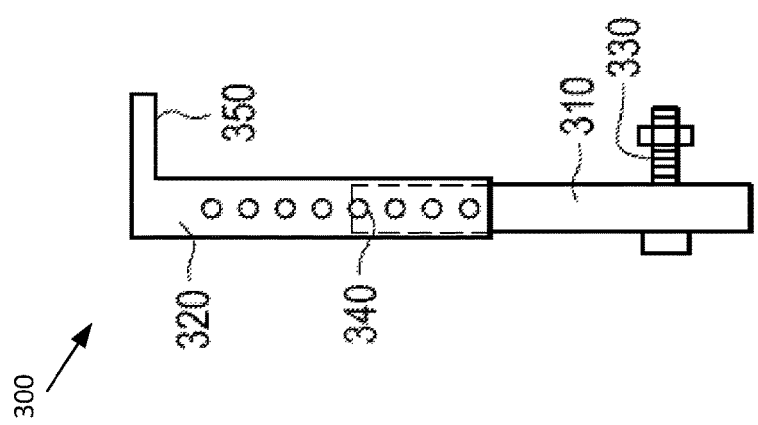
FIG. 3 depicts a side view of an adjustable mounting arm, according to an embodiment.

FIG. 3 depicts one embodiment of a side view of an adjustable mounting arm 300, and FIG. 4 depicts a back view of adjustable mounting arm 300. In embodiments adjustable mounting arm 300 may represent adjustable mounting arm 132, 232, 142, or 242.

Mounting arm 300 may include a bottom portion 310 and a top portion 320. Bottom portion 310 may include bolt 330 and an orifice 360. Orifice 360 may extend through bottom portion 310, wherein bolt 330 may extend through bottom orifice 360 and a channel positioned on a sidewall. Responsive to the bolt being inserted through orifice 360 and the channel, mounting arm 300 may move in a direction aligned with the channel.

Bottom Portion 310 and top portion 320 may include plurality of orifices 340 that are configured to align, wherein fastener 370 is configured to extend through top portion 310 and bottom portion 320 to couple top portion 320 and bottom portion 310. Responsive to inserting fastener 370 through top portion 320 and bottom portion 310, top portion 320 may be secured in place. Responsive to removing fastener 370 and inserting fastener 370 through different orifices positioned on top portion 320 and bottom portion 310, the height of an upper surface of top portion 320 may be dynamically changed.

Projection 350 may extend away from a base surface of universal electric engine mount 100, wherein projection 350 may be configured to be positioned over a chassis of a vehicle. Projection 350 may be configured to secure the universal electric engine mount to a chassis and/or motor mount of a vehicle. In embodiments, Projection 350 may extend away from a base surface of the universal electric engine mount.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention.

Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s).

What is claimed is:

1. An engine mount for a vehicle comprising:
   a mounting surface configured to receive an engine of the vehicle;
   a first channel extending in a direction from a front of the mounting surface towards a rear of the mounting surface;
   a first mounting arm coupled with the first channel being configured to have a changeable height, and being configured to move along the first channel;
   a mounting projection positioned on an upper surface of the first mounting arm, the mounting projection extending in a direction away from the mounting surface.

2. The engine mount of claim 1, where the first mounting arm has a variable height based on the positioning of an upper portion of the first mounting arm on a lower portion of the first mounting arm.

3. The engine mount of claim 1, wherein an upper portion and a lower portion are removably coupled together via a fastener, wherein responsive to removing the fastener a vertical offset of the upper portion can be changed.

4. The engine mount of claim 1, further including:
   a first sidewall positioned on a first side of the engine mount, wherein the first channel is positioned within the first sidewall.

5. The engine mount of claim 4, wherein the first sidewall does not extend across the entirety of the first side of the engine mount.

6. The engine mount of claim 5, further comprising:
   an engine mounting harness configured to secure the engine to the mounting surface, wherein the engine mounting harness is positioned between the rear of the mounting surface and an end of the first sidewall.

7. The engine mount of claim 1, further comprising:
   a first bolt configured to couple the first mounting arm to the engine mount via the first channel, wherein the first bolt is configured to extend through the channel and the first mounting arm.

8. A method of mounting an engine for a vehicle comprising:
   positioning a mounting surface configured to receive the engine within the vehicle;
   coupling a first mounting arm with a first channel, the first channel extending in a direction from a front of the mounting surface towards a rear of the mounting surface, the first mounting arm including a mounting projection positioned on an upper surface of the first mounting arm, the mounting projection extending in a direction away from the mounting surface;
   laterally moving the first mounting arm within the channel;
   vertically moving an upper surface of the mounting projection.

9. The method of claim 8, where the first mounting arm has a variable height based on the positioning of an upper portion of the first mounting arm on a lower portion of the first mounting arm.

10. The method of claim 8, further comprising:
    removably coupling an upper portion and a lower portion via a fastener;
    removing the fastener to change a vertical offset of the upper portion.

11. The method of claim 8, wherein the mounting surface includes a first sidewall positioned on a first side of an engine mount, wherein the first channel is positioned within the first sidewall.

12. The method of claim 11, wherein the first sidewall does not extend across the entirety of the first side of the engine mount.

13. The method of claim 12, further comprising:
    securing the engine to the mounting surface via an engine mounting harness, wherein the engine mounting harness is positioned between the rear of the mounting surface and an end of the first sidewall.

* * * * *